(12) United States Patent
Kolman et al.

(10) Patent No.: US 8,856,923 B1
(45) Date of Patent: Oct. 7, 2014

(54) SIMILARITY-BASED FRAUD DETECTION IN ADAPTIVE AUTHENTICATION SYSTEMS

(75) Inventors: Eyal Kolman, Tel-Aviv (IL); Alon Kaufman, Bnei-Dror (IL); Yael Villa, Tel-Aviv (IL)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/537,958

(22) Filed: Jun. 29, 2012

(51) Int. Cl.
  *G06Q 20/00* (2012.01)
  *G06Q 20/40* (2012.01)
(52) U.S. Cl.
  CPC .................................. *G06Q 20/4016* (2013.01)
  USPC ................. 726/22; 705/67; 705/318; 726/23; 726/25; 726/4; 380/28; 380/255; 709/203; 709/224; 709/227; 713/155; 713/182
(58) Field of Classification Search
  CPC ..... G06Q 20/4016; G06Q 20/40; G06F 21/31
  See application file for complete search history.

(56) References Cited

U.S. PATENT DOCUMENTS

| | | | | |
|---|---|---|---|---|
| 6,088,451 | A * | 7/2000 | He et al. .............................. | 726/8 |
| 6,330,546 | B1 * | 12/2001 | Gopinathan et al. ............. | 705/35 |
| 6,714,918 | B2 * | 3/2004 | Deshpande et al. ............. | 705/18 |
| 7,433,855 | B2 * | 10/2008 | Gavan et al. ..................... | 706/47 |
| 7,827,045 | B2 * | 11/2010 | Madill et al. ...................... | 705/4 |
| 7,853,533 | B2 * | 12/2010 | Eisen .............................. | 705/64 |
| 7,874,000 | B1 * | 1/2011 | Lal .................................. | 726/23 |
| 7,908,644 | B2 * | 3/2011 | Roskind et al. .................... | 726/3 |
| 8,019,678 | B2 * | 9/2011 | Wright et al. ..................... | 705/38 |
| 8,020,763 | B1 * | 9/2011 | Kowalchyk et al. ........... | 235/380 |
| 8,290,838 | B1 * | 10/2012 | Thakur et al. .................... | 705/35 |
| 8,321,360 | B2 * | 11/2012 | Lanxner et al. ................. | 706/20 |
| 8,429,545 | B2 * | 4/2013 | Dixon et al. ..................... | 715/760 |
| 2003/0037251 | A1 * | 2/2003 | Frieder et al. .................. | 713/200 |
| 2005/0182708 | A1 * | 8/2005 | Moudgal .......................... | 705/38 |
| 2005/0203881 | A1 * | 9/2005 | Sakamoto et al. ................ | 707/3 |
| 2005/0276401 | A1 * | 12/2005 | Madill et al. ............. | 379/114.14 |
| 2006/0253458 | A1 * | 11/2006 | Dixon et al. ..................... | 707/10 |
| 2006/0259950 | A1 * | 11/2006 | Mattsson ........................... | 726/1 |
| 2007/0106582 | A1 * | 5/2007 | Baker et al. ..................... | 705/35 |
| 2008/0046334 | A1 * | 2/2008 | Lee et al. ......................... | 705/26 |
| 2008/0154770 | A1 * | 6/2008 | Rutherford et al. ............. | 705/44 |
| 2009/0300150 | A1 * | 12/2009 | Rudy et al. ..................... | 709/222 |
| 2010/0121916 | A1 * | 5/2010 | Lin .................................. | 709/203 |
| 2010/0228656 | A1 * | 9/2010 | Wasserblat et al. ............. | 705/35 |
| 2010/0269175 | A1 * | 10/2010 | Stolfo et al. ..................... | 726/22 |
| 2010/0280950 | A1 * | 11/2010 | Faith et al. ...................... | 705/44 |
| 2011/0099628 | A1 * | 4/2011 | Lanxner et al. ................. | 726/22 |
| 2012/0016796 | A1 * | 1/2012 | Driemeyer et al. ............. | 705/39 |
| 2012/0311705 | A1 * | 12/2012 | Dixon et al. ..................... | 726/22 |
| 2013/0024358 | A1 * | 1/2013 | Choudhuri et al. ............. | 705/38 |

\* cited by examiner

*Primary Examiner* — Morshed Mehedi
*Assistant Examiner* — Sharon Lynch
(74) *Attorney, Agent, or Firm* — Ryan, Mason & Lewis, LLP

(57) ABSTRACT

Similarity-based fraud detection techniques are provided in adaptive authentication systems. A method is provided for determining if an event is fraudulent by obtaining a plurality of tagged events and one or more untagged events, wherein the tagged events indicate a likelihood of whether the corresponding event was fraudulent; constructing a graph, wherein each node in the graph represents an event and has a value representing a likelihood of whether the corresponding event was fraudulent and wherein similar transactions are connected via weighted links; diffusing through weights in the graph to assign values to nodes such that neighbors of nodes having non-zero values receive similar values as the neighbors; and classifying whether at least one of the one or more untagged events is fraudulent based on the assigned values.

17 Claims, 2 Drawing Sheets

SIMILARITY-BASED FRAUD DETECTION IN ADAPTIVE AUTHENTICATION SYSTEMS

FIELD OF THE INVENTION

The present invention relates generally to techniques for detecting fraud in network communication systems.

BACKGROUND OF THE INVENTION

Service providers receive login attempts from users wishing to gain access to sensitive information, such as bank accounts. Some users attempt to gain access to such information with credentials obtained fraudulently from a legitimate account holder.

Adaptive authentication techniques identify fraudulent users even though such users possess credentials to gain access to a legitimate user's account information. For example, each login attempt is received at the service provider at a particular time, and in many cases a fraudulent user will send login attempts at times outside of those expected by a service provider. Existing adaptive authentication techniques compare information associated with a login attempt received by the service provider, such as the time of the login and a location from where the login originated, with a historical record of a typical user who exhibits some expected login behavior. For example, if a high percentage of prior login attempts received by the service provider from a particular user occur between the hours of 6 AM and 11 PM daily and from locations within the continental United States, then login attempts between 2 AM and 4 AM from locations across Eastern Europe, have a high risk of being a fraudulent user.

Adaptive authentication techniques apply a challenge to such risky transactions, where the riskiness estimation arrives from a fraud/genuine classifier. The answer to the challenge (e.g., a pass/fail result) is used to improve the accuracy of the model within a supervised learning Bayesian methodology. Hence, challenges mostly affect the classification of the specific transaction that invoked the challenge. In addition, there is currently no automated mechanism for classifying previously untagged transactions.

A need therefore exists for classifying previously untagged transactions in an Adaptive Authentication system.

SUMMARY OF THE INVENTION

The present invention in the illustrative embodiments described herein provides similarity-based fraud detection in adaptive authentication systems. In accordance with an aspect of the invention, a method is provided for determining if an event is fraudulent. The method comprises the steps of: obtaining a plurality of tagged events and one or more untagged events, wherein the tagged events indicate a likelihood of whether the corresponding event was fraudulent; constructing a graph, wherein each node in the graph represents an event and has a value representing a likelihood of whether the corresponding event was fraudulent and wherein similar transactions are connected via weighted links; diffusing through weights in the graph to assign values to nodes such that neighbors of nodes having non-zero values receive similar values as the neighbors; and classifying whether at least one of the one or more untagged events is fraudulent based on the assigned values.

In one exemplary embodiment, the events tagged as frauds have a value of 1; un-tagged events have value of 0; and genuine events have a negative value of $-\alpha$ ($0 \le \alpha \le 1$), where $\alpha$ represents a ratio between a significance of being similar to a fraudulent event and being similar to a genuine event. The weighted links between nodes can have weights, $0 \le l_{ij} \le 1$, where $l_{ij}$ is the weight of the link between nodes i and j. The classifying step can further comprise aggregating influences of the at least one un-tagged event.

The fraud detection techniques of the illustrative embodiments overcome one or more of the problems associated with the conventional techniques described previously, and provide improved security by detecting fraud based on a similarity of a transaction to known fraudulent transactions. Moreover, no modification of the applications or communication protocols is required. These and other features and advantages of the present invention will become more readily apparent from the accompanying drawings and the following detailed description.

DETAILED DESCRIPTION

The present invention provides similarity-based fraud detection in Adaptive Authentication (AA) systems, or other risk assessment systems. According to one aspect of the invention, fraud is detected based on a similarity of a transaction to known fraudulent transactions. Generally, a plurality of transactions having a portion of the transactions tagged as a fraudulent transaction or a genuine transaction is processed. The tagged transactions are used in accordance with aspects of the invention to classify other untagged transactions as a fraudulent transaction or a genuine transaction, on the basis of their similarity to the tagged transactions.

In one exemplary embodiment, the data is represented as an undirected graph where nodes represent transactions and similar transactions are connected via weighted links. The weights describe the similarity between transactions. For example, larger weights can be assigned to higher similarity values. Each node in the graph is assigned a value that represents a probability of being a fraudulent transaction. Initially, fraudulent nodes have values of 1 (for example) and genuine nodes have a negative value, such as −1. All unknown transactions have values of 0.

As discussed further below in conjunction with FIG. 3, an exemplary similarity-based fraud detection process 300 detects frauds by diffusing through the weights in the graph. The neighbors of nodes having non-zero values receive similar values as their neighbor, based on the value of the neighbor and the weight of the link between them. For example, a node that is strongly connected to a known fraud would be assigned a high value of being a fraud, such as 0.8. The exemplary similarity-based fraud detection process 300 continues iteratively and can be viewed as a diffusion of the statuses of the tagged nodes through the graph edges. The diffusion is applied in a similar method as the Dijkstra's algorithm, so the complexity can be expressed as $O(Nt|E|+Nt|V|\log|V|)$, where Nt is the number of tagged nodes; |E| is the number of graph edges; and |V| is the number of vertices in the graph.

The exemplary similarity-based fraud detection process 300 will halt after a small number of the hops so the complexity is much smaller.

In this manner, when the exemplary similarity-based fraud detection process 300 is complete, events that are similar to known frauds will have high values. Since these events have a high probability of themselves being fraudulent, the process 300 will detect new, unknown frauds, based on the known frauds. These "probably fraudulent" events can later be flagged as potential frauds and be presented to an analyst, or can be used as input to the risk engine to better detect subsequent transactions.

Figure 1:
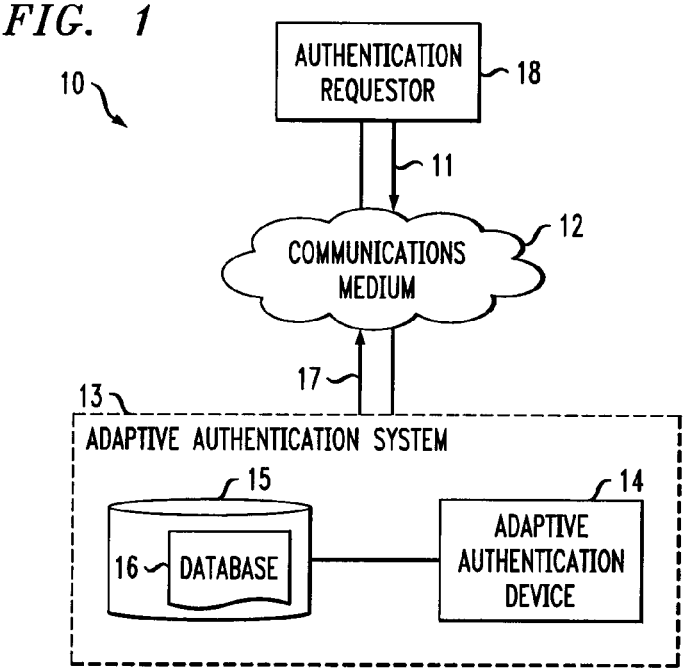
FIG. 1 is a schematic diagram illustrating an electronic environment in which the present invention can be implemented.

FIG. 1 illustrates an electronic environment 10 for carrying out the improved technique. Electronic environment 10 includes communications medium 12, authentication requestor 18 and adaptive authentication system 13.

Communication medium 12 provides connections between adaptive authentication system 13 and authentication requestor 18. The communications medium 12 may implement a variety of protocols such as TCP/IP, UDP, ATM, Ethernet, Fibre Channel, combinations thereof, and the like. Furthermore, the communications medium 12 may include various components (e.g., cables, switches/routers, gateways/bridges, NAS/SAN appliances/nodes, interfaces, etc.). Moreover, the communications medium 12 is capable of having a variety of topologies (e.g., queue manager-and-spoke, ring, backbone, multi drop, point to-point, irregular, combinations thereof, and so on).

Authentication requestor 18 is constructed and arranged to receive, from a user, requests to access data and send, to adaptive authentication system 13, request 11 to authenticate the user. Authentication requestor 18 is further constructed and arranged to receive an adaptive authentication result 17 which indicates whether the user is a high risk of being a fraudulent user.

Request 11 takes the form of a message that includes various facts and their values; such messages are embedded in a payload of a data packet. Request 11 typically includes a username for the user and a timestamp indicating a time.

Adaptive authentication system 13 is constructed and arranged to receive authentication request 11 from authentication requestor 18. Adaptive authentication system 13 is also constructed and arranged to generate adaptive authentication result 17 based on request 11 and a baseline profile of the user, a baseline profile including a history of requests from a user over several previous time windows. Adaptive authentication system 13 is further constructed and arranged to send adaptive authentication result 17 to authentication requestor 18. Adaptive authentication system 13 includes adaptive authentication device 14 and storage device 15.

Storage device 15 is constructed and arranged to store database 16 which contains current and baseline profiles for a user. Database 16 includes a set of entries, each entry of which includes a user identifier, a time period and user data.

Adaptive authentication device 14 is constructed and arranged to perform adaptive authentication operations on request 11 according to the improved technique and takes the form of a desktop computer, laptop, server or tablet computer. Specifically, adaptive authentication device 14 receives request 11 from authentication requestor 18 and accesses the baseline profile having a user identifier matching the username of request 11. Further detail concerning adaptive authentication device 14 are described below with regard to FIG. 2.

Figure 2:
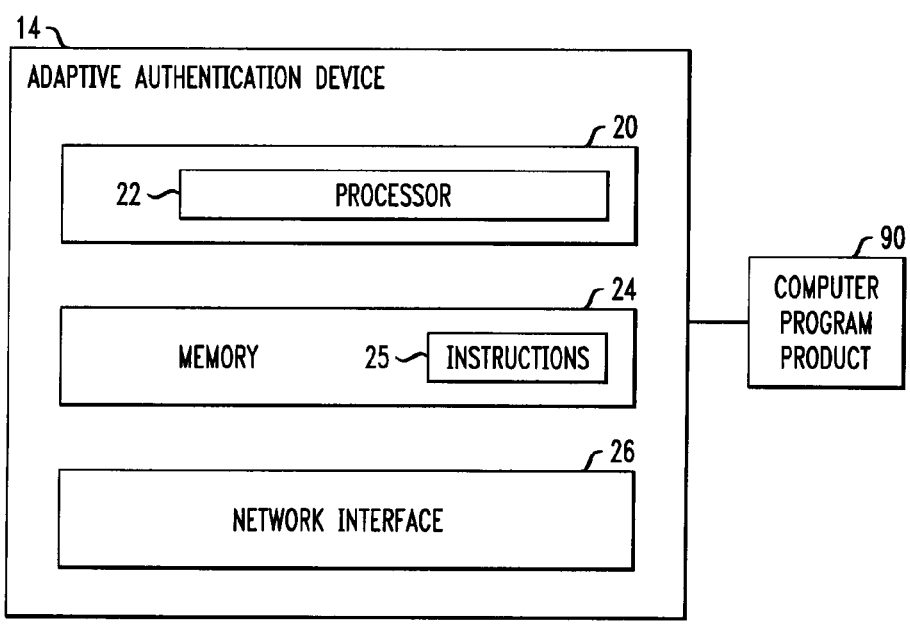
FIG. 2 is a schematic diagram illustrating an adaptive authentication device within the electronic environment shown in FIG. 1.

FIG. 2 illustrates components of adaptive authentication device 14. Adaptive authentication device 14 includes a controller 20 which in turn includes a processor 22, a memory 24 and a network interface 26.

Memory 24 is configured to store code which includes instructions 25 to process an authentication request from an authentication requestor. Memory 24 is further configured to store data from database 16 and request 11. Memory 24 generally takes the form of, e.g., random access memory, flash memory or a non-volatile memory.

Processor 22 can take the form of, but is not limited to, an Intel or AMD-based MPU, and can be a single or multi-core running single or multiple threads. Processor 22 is coupled to memory 24 and is configured to execute the instructions 25 stored in memory 24.

Network interface 26 is constructed and arranged to send and receive data over communications medium 12. Specifically, network interface 26 is configured to receive request 11 from and to send adaptive authentication result 17 to authentication requestor 18.

Returning to FIG. 1, adaptive authentication result 17 indicates a likelihood that request 11 is associated with fraudulent activity. Processor 22 generates adaptive authentication result 17 based on fact values of request 11 and user data in database 16. Further details regarding the generation of adaptive authentication result 17 are described below.

During operation, authentication requestor 18 sends request 11 to adaptive authentication device 14 via network interface 26. Processor 22 stores data such as the username, fact values and timestamp from request 11 in memory 24. Processor 22 accesses database 16 and performs a lookup operation on the username; that is, processor 22 compares the username to user identifiers in each entry of database 16 and chooses those entries having a user identifier which matches the username.

The lookup operation will result in several entries from database 16, each of whose user identifiers matches the username stored in memory 24 but has user data corresponding to a time interval. The time intervals of the entries of the database that have a user identifier that matches the username of request 11 are distinct and nonoverlapping. For example, while one entry has a time interval which ends at the current time and began at 12 AM the previous Sunday, another entry has a time interval which ends at 11:59 PM the previous Saturday and begins at 12 AM the Sunday prior, and so on.

In some arrangements, in order to limit memory consumption in storage device 15, the number of entries having user identifiers matching the username is limited to those having time intervals corresponding to the current time period and the four most recent previous time periods. Thus, returning to the above example, when at 12 AM Sunday processor 22 creates a new entry in database 16 having a user identifier matching the username, processor 22 also deletes a corresponding entry having a time interval which is five weeks older than the newly created entry.

Processor 22 then combines the fact values stored in memory 24 with the fact values in the entry of database 16 that corresponds to the current time interval. For a more detailed discussion of suitable Adaptive Authentication systems, see for example, U.S. patent application Ser. No. 13/246,937, filed Sep. 28, 2011, entitled "Using Baseline Profiles In Adaptive Authentication" and/or U.S. patent application Ser. No. 12/751,057, filed Mar. 31, 2010, entitled "Techniques for Authenticating Users of Massive Multiplayer Online Role Playing Games Using Adaptive Authentication," (now U.S. Pat. No. 8,370,389), each incorporated by reference herein.

Figure 3:
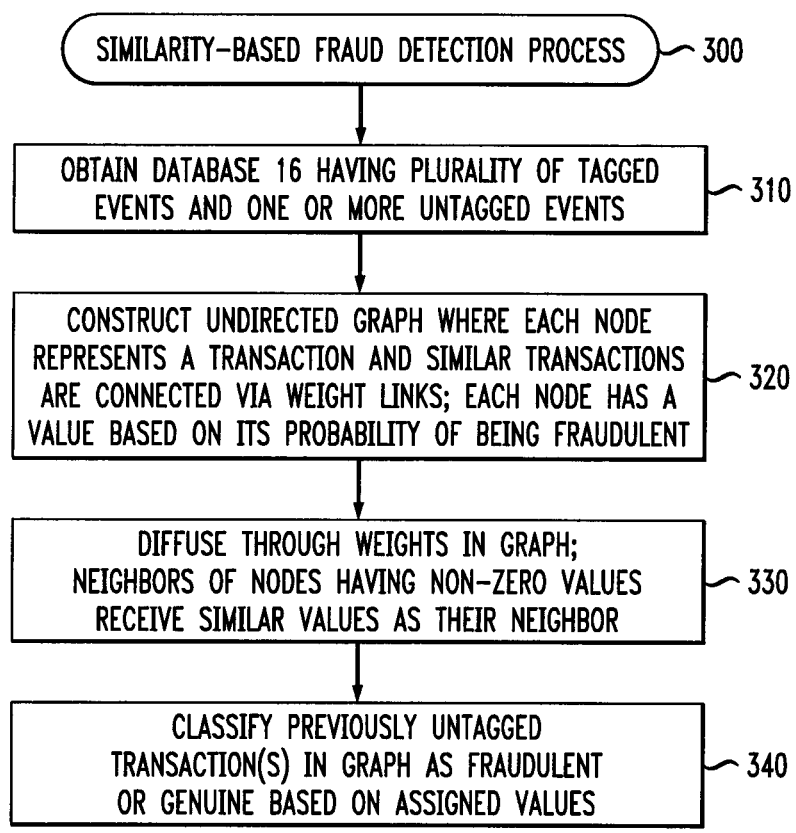
FIG. 3 is a flow chart describing an exemplary implementation of a similarity-based fraud detection process that incorporates aspects of the present invention.

FIG. 3 is a flow chart describing an exemplary implementation of an exemplary similarity-based fraud detection process 300 that incorporates aspects of the present invention. As shown in FIG. 3, the exemplary similarity-based fraud detection process 300 initially obtains the database 16 having plurality of tagged events (e.g., tagged as a fraudulent event or a genuine event) and one or more untagged events during step 310.

Thereafter, the exemplary similarity-based fraud detection process 300 constructs an undirected graph during step 320, where each node represents a transaction and similar transactions are connected via weight links. In addition, each node has a value based on the probability that the transaction is a fraudulent transaction.

For example, transactions tagged as frauds can have a value of 1; un-tagged events can have value of 0; and genuine events can have a negative value of $-\alpha$, where $0 \leq \alpha \leq 1$. The size of $\alpha$ represents a ratio between the significance of being similar to a fraudulent event and being similar to a genuine event.

In addition, the links between nodes have weights, $0 \leq l_{ij} \leq 1$, where $l_{ij}$ is the weight of the link between nodes i and j. l=1 represents full similarity, and l=0 represents full dissimilarity. The length of a path between nodes i and j, $d_{ij}$, is the multiplication of the weights of the links that belong to the path. For computational reasons, it is useful to add a hard stop: $d_{ij}=0$ for all paths with length≥max_length (e.g., max_length=3).

The weight of link $l_{ij}$, or the similarity between events i and j, is a weighted aggregation of the attributes identicalness $$l_{ij} = \frac{\sum_{k=1}^{N} c_k U(i_k, j_k)}{\sum_{k=1}^{N} c_k};$$

where N is the number of attributes of the event, $c_k$ is the weight of each attribute, and U( ) is the identity operator: U(x,y)=1 if x=y, and 0 otherwise. The attributes significance, $c_k$, can be set on the basis of information tests (i.e., given two events with an identical $k^{th}$ attribute, what is the posterior probability that if one event is fraudulent so is the other one. The larger this probability, the larger is $c_k$). Thus, $c_k$ is large for attributes that possess unique values for fraudulent events and other values for common, genuine events. Additionally, attributes that are common in many transactions/users (e.g., IP that is used by many users) are optionally ignored. More sophisticated approaches can also consider combinations of attributes.

During step 330, the exemplary similarity-based fraud detection process 300 diffuses through the weights in the graph. The neighbors of nodes having non-zero values are assigned similar values as their neighbor, based on the value of the neighbor and the weight of the link between them. In this manner, the fraudulent and genuine statuses of the tagged events diffuse through the graph links to the untagged events. Let i be a node with a tagged status $s_i$, and let j be a non-tagged node, with a path to i with a weight $d_{ij}$. Then, the influence of i on j is $d_{ij} \cdot s_i$.

Finally, previously untagged transaction(s) in the graph are classified as fraudulent or genuine transactions during step 340 based on the values assigned during step 330. To set the value of an un-tagged event, its influences can be aggregated. The aggregation function, f, should have the following characteristics:

$$-\alpha \leq f(d_1 s_1, d_2 s_2, \ldots, d_n s_n) \leq 1,$$

where $-\alpha$ is the value of a tagged genuine event.

$$f(a)=a$$

$$f(a,b) > f(a) \cdot \forall b > 0$$

$$f(a,b) < f(a) \cdot \forall b < 0$$

An example of such a function is a variant of the fuzzy interactive-or operator that was introduced in Benitez et al., "Are Artificial Neural Networks Black Boxes?" (1997):

$$f(x_1, x_2, \ldots, x_n) = 2 \cdot \frac{y_1 \cdot y_2 \cdot \ldots \cdot y_n}{(1-y_1) \cdot (1-y_2) \cdot \ldots \cdot (1-y_n) + y_1 \cdot y_2 \cdot \ldots \cdot y_n} - 1$$

where y is a linear transformation from the [-1,1] domain to the [0,1] domain:

$$y_i = \frac{1+x_i}{2}$$

Hence, the estimated status is $s_j = f(d_{1j} \cdot s_1, d_{2j} \cdot s_2, \ldots, d_{Nj} \cdot s_N)$ where N is the number of nodes in the graph. Practically, this can be applied by only using the tagged events which significantly reduces the complexity.

While various embodiments of the invention have been particularly shown and described, it will be understood by those skilled in the art that various changes in form and details may be made therein without departing from the spirit and scope of the invention as defined by the appended claims.

Furthermore, it should be understood that some embodiments are directed to adaptive authentication device 14 which identifies particular events for alerting within event notification management system. Some embodiments are directed to adaptive authentication device 14. Some embodiments are directed to a system which processes an authentication request from an authentication requestor. Some embodiments are directed to a method of processing an authentication request from an authentication requestor. Also, some embodiments are directed to a computer program product which enables computer logic to process an authentication request from an authentication requestor.

In some arrangements, adaptive authentication device 14 is implemented by a set of processors or other types of control/processing circuitry running software. In such arrangements, the software instructions can be delivered to adaptive authentication device 14 in the form of a computer program product (illustrated generally by code for computer program 90 stored within memory 24 in FIG. 2) having a computer readable storage medium which stores the instructions in a non-volatile manner. Alternative examples of suitable computer readable storage media include tangible articles of manufacture and apparatus such as CD-ROM, flash memory, disk memory, tape memory, and the like.

As mentioned previously herein, the above-described embodiments of the invention are presented by way of illustrative example only. Numerous variations and other alternative embodiments may be used.

Additional details regarding certain conventional cryptographic techniques referred to herein may be found in, e.g., A. J. Menezes et al., Handbook of Applied Cryptography, CRC Press, 1997, which is incorporated by reference herein.

The term "authentication information" as used herein is intended to include passwords, passcodes, answers to life questions, or other authentication credentials, or values derived from such authentication credentials, or more generally any other information that a user may be required to submit in order to obtain access to an access-controlled application. Although the illustrative embodiments are described herein in the context of passwords, it is to be appreciated that the invention is more broadly applicable to any other type of authentication information.

The illustrative embodiments of the invention as described herein provide an improved authentication of users of password-based authentication systems. Advantageously, the illustrative embodiments do not require changes to existing communication protocols. It is therefore transparent to both existing applications and communication protocols. The described techniques may be used with security tokens that generate one-time passwords or other types of authentication information, regardless of whether such tokens are connectable to the user device.

It should again be emphasized that the particular authentication techniques described above are provided by way of illustration, and should not be construed as limiting the present invention to any specific embodiment or group of embodiments. For example, as previously noted, the described embodiments may be adapted in a straightforward manner to operate with other types of time-varying credentials or authentication information, rather than just token codes, and other types of access-controlled resources. Also, the particular configuration of system elements shown in the figures and their interactions, may be varied in other embodiments.

Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method of determining if an event is fraudulent, the method comprising:
    obtaining a plurality of events comprising a plurality of tagged events and one or more untagged events, wherein each tagged event of said tagged events comprises a fraudulent score value indicating a likelihood of whether said tagged event corresponding to said fraudulent score value was fraudulent;
    determining a similarity weight between each pair of said plurality of events to generate a plurality of similarity weights, said similarity weight indicating a similarity between said events in a given pair, wherein said determining a similarity weight further comprises constructing a undirected graph where each node in said graph corresponds to one of said plurality of events and wherein said plurality of events are connected using weighted links;
    processing said similarity weights to assign a fraudulent score value to one or more of said untagged events such that said one or more untagged events receive a fraudulent score value based on said fraudulent score values of said tagged events that are similar to said one or more untagged events; and
    classifying whether at least one of said one or more untagged events is fraudulent based on said assigned fraudulent score values.

2. The method of claim 1, wherein said tagged events tagged have a value of 1; said un-tagged events have a value of 0; and genuine events have a negative value of $-\alpha$ ($0 \leq \alpha \leq 1$), where $\alpha$ represents a ratio between a significance of being similar to a fraudulent event and being similar to a genuine event.

3. The method of claim 1, wherein said weighted links between events have weights, $0 \leq l_{ij} \leq 1$, where $l_{ij}$ is the weight of the link between events i and j.

4. The method of claim 3, wherein said weighted links have a value of 1 to represent full similarity and a value of 0 to represent full dissimilarity.

5. The method of claim 3, wherein a length of a path between events i and j is a multiplication of the weights of the links that belong to the path.

6. The method of claim 3, wherein the weight of the link $l_{ij}$ is a weighted aggregation of identicalness of attributes $$l_{ij} = \frac{\sum_{k=1}^{N} c_k U(i_k, j_k)}{\sum_{k=1}^{N} c_k},$$

where N is a number of attributes of the event, $c_k$ is the weight of each attribute, and U( ) is an identity operator.

7. The method of claim 1, wherein said classifying step further comprises the step of aggregating influences of said one or more untagged events.

8. The method of claim 1, wherein said method is performed iteratively to assign values to additional ones of said untagged events.

9. An article of manufacture comprising a non-transitory machine-readable recordable storage medium for determining if an event is fraudulent, wherein one or more software programs when executed by one or more processing devices implement the following steps:
    obtaining a plurality of events comprising a plurality of tagged events and one or more untagged events, wherein each tagged event of said tagged events comprises a fraudulent score value indicating a likelihood of whether said tagged event corresponding to said fraudulent score value was fraudulent;
    determining a similarity weight between each pair of said plurality of events to generate a plurality of similarity weights, said similarity weight indicating a similarity between said events in a given pair, wherein said determining a similarity weight further comprises constructing a undirected graph where each node in said graph corresponds to one of said plurality of events and wherein said plurality of events are connected using weighted links;
    processing said similarity weights to assign a fraudulent score value to one or more of said untagged events such that said one or more untagged events receive a fraudulent score value based on said fraudulent score values of said tagged events that are similar to said one or more untagged events; and
    classifying whether at least one of said one or more untagged events is fraudulent based on said assigned fraudulent score values.

10. A system for determining if an event is fraudulent, the system comprising:
    a memory; and
    at least one hardware device, coupled to the memory, operative to:
    obtain a plurality of events comprising a plurality of tagged events and one or more untagged events, wherein each tagged event of said tagged events comprises a fraudulent score value indicating a likelihood of whether said tagged event corresponding to said fraudulent score value was fraudulent;

determine a similarity weight between each pair of said plurality of events to generate a plurality of similarity weights, said similarity weight indicating a similarity between said events in a given pair, wherein said similarity weight is determined by constructing a undirected graph where each node in said graph corresponds to one of said plurality of events and wherein said plurality of events are connected using weighted links;

process said similarity weights to assign a fraudulent score value to one or more of said untagged events such that said one or more untagged events receive a fraudulent score value based on said fraudulent score values of said tagged events that are similar to said one or more untagged events; and classify whether at least one of said one or more untagged events is fraudulent based on said assigned fraudulent score values.

11. The system of claim 10, wherein said tagged events have a value of 1; said un-tagged events have a value of 0; and genuine events have a negative value of $-\alpha$ ($0 \leq \alpha \leq 1$), where $\alpha$ represents a ratio between a significance of being similar to a fraudulent event and being similar to a genuine event.

12. The system of claim 10, wherein said weighted links between events have weights, $0 \leq l_{ij} \leq 1$, where $l_{ij}$ is the weight of the link between events i and j.

13. The system of claim 12, wherein said weighted links have a value of 1 to represent full similarity and a value of 0 to represent full dissimilarity.

14. The system of claim 12, wherein a length of a path between events i and j is a multiplication of the weights of the links that belong to the path.

15. The system of claim 12, wherein the weight of the link $l_{ij}$ is a weighted aggregation of identicalness of attributes $$l_{ij} = \frac{\sum_{k=1}^{N} c_k U(i_k, j_k)}{\sum_{k=1}^{N} c_k},$$

where N is a number of attributes of the event, $c_k$ is the weight of each attribute, and U( ) is an identity operator.

16. The system of claim 10, wherein said classifying step further comprises the step of aggregating influences of said one or more untagged events.

17. The system of claim 10, wherein said values are assigned iteratively to additional ones of said untagged events.

* * * * *